UNITED STATES PATENT OFFICE.

DENNIS J. MURPHY, OF HOG ISLAND, PENNSYLVANIA.

KEROSENE-EMULSION COMPOSITION.

1,374,755.  Specification of Letters Patent.  Patented Apr. 12, 1921.

No Drawing. Application filed August 22, 1919, Serial No. 319,157. Renewed March 1, 1921. Serial No. 448,867.

*To all whom it may concern:*

Be it known that I, DENNIS J. MURPHY, a citizen of the United States, residing at Hog Island, in the county of Delaware and State of Pennsylvania, have invented new and useful Improvements in Kerosene-Emulsion Compositions, of which the following is a specification.

The invention relates to compositions of matter and has for an object to provide a composition of kerosene and other elements which will emulsify with water and other liquids.

It is well known that kerosene, coal oil or other similar oily products ordinarily do not mix with water or emulsify, and although I am aware that various oils have been emulsified heretofore, the emulsions produced in the prior processes have not been permanent and the ingredients soon separate from each other.

In preparing my kerosene emulsion, I mix with the kerosene, oleic and stearic acids which mixture is then subjected to heat and I then add other ingredients such as potassium hydrate and water, producing the desired mixture although it will of course be understood that various other products such as cyanid of potassium or sodium solutions can also be employed without breaking down or destroying the emulsion. It is necessary to employ pure potassium hydrate, as distinguished from crude material consisting largely of carbonate.

I preferably also add various poisonous solutions such as mentioned above, in order that the emulsion can be adapted particularly to the spraying and treating of trees, foliage and shrubbery, so as to exterminate insects and prevent scale or growths which ordinarily would tend to injure the tree or shubbery or the fruit thereof.

It is therefore understood that after preparing the emulsion I may add such poisonous or other insect-destroying solutions, capable of effecting the mentioned purpose. The product is, in such a case, not only an insecticide, but also a fungicide and a parasiticide.

In preparing the base composition I prefer to use the ingredients in substantially the following proportions:—

50–55 quarts of kerosene (52 quarts or about 85 pounds being generally especially suitable),
1–3 pounds of oleic acid,
1 pound of stearic acid,
1 pound of potassium hydrate (pure),
5 quarts of water.

The oleic and stearic acids are first dissolved in the kerosene which is heated to a temperature of 122° Fahrenheit. When these ingredients are dissolved and thoroughly mixed, I add the potassium hydrate which has been previously dissolved in the water. The poison, if used, may also be dissolved in this water. The resulting mixture is now thoroughly stirred and brings about the desired emulsion which I have found will not deteriorate regardless of time or weather conditions.

I may desire to include cyanid of potassium or cyanid of sodium, as poison to be used, and I have found that the addition of such poisonous solutions will not destroy the emulsion as prepared.

In place of kerosene, I can also employ other mineral oil products in the same or substantially the same proportions as above given.

While the relative quantities above stated are susceptible of slight variations, an excellent mixture is obtained thereby and this mixture can be sprayed or otherwise applied to trees or shrubbery when used for the purpose of destroying dangerous scale, microbes, insects, and bugs which ordinarily would tend to greatly damage the structure and fruit of the tree or foliage.

It is, of course, to be understood that this emulsion, when to be used for the spraying of trees, plants, etc., will be diluted by the user to any desired extent. In practice, a dilution of 1:100 or even to 1:300, will produce a spray which is highly effective for the destruction of insects on plants, without injury to the plants.

I claim:

1. A kerosene emulsion containing kerosene emulsified with the reaction products of potassium hydrate, oleic acid and stearic acid, in water, the amount of kerosene being at least several times as much as the combined amounts of the fatty acids and potassium hydrate.

2. A kerosene emlusion containing the reaction products of 50 to 55 quarts of kerosene, 1 to 3 pounds of oleic acid, 1 pound stearic acid, 1 pound potassium hydrate, and 5 quarts of water, such emulsion being highly stable.

3. An emulsion containing the reaction products of potassium hydrate, oleic acid and stearic acid, and containing a mineral oil distillate, the latter forming substantially more than half of the entire product, such emulsion being highly stable.

4. An emulsion containing the reaction products of 50 to 55 quarts of a mineral oil, 1 to 3 pounds oleic acid, 1 pound of stearic acid, 1 pound of potassium hydrate, and water, such emulsion being highly stable.

In testimony whereof I affix my signature.

DENNIS J. MURPHY.